United States Patent [19]
Doolittle et al.

[11] Patent Number: 6,105,086
[45] Date of Patent: Aug. 15, 2000

[54] DATA COMMUNICATION CIRCUIT AND METHOD FOR BUFFERING DATA BETWEEN A SHARED RESOURCE AND MULTIPLE INTERFACES

[75] Inventors: Timothy N. Doolittle, Oakdale; Jeffrey J. Holm, Edina, both of Minn.

[73] Assignee: LSI Logic Corporation, Milpitas, Calif.

[21] Appl. No.: 09/090,467

[22] Filed: Jun. 4, 1998

[51] Int. Cl.$^7$ ..................................................... G06F 3/00
[52] U.S. Cl. ............................... 710/52; 710/53; 710/55; 710/57; 709/100; 709/103; 711/151
[58] Field of Search ................................ 710/44, 54, 57, 710/52, 53, 55; 709/103; 711/141, 151; 345/513, 521

[56] References Cited

U.S. PATENT DOCUMENTS

| | | | |
|---|---|---|---|
| 4,847,750 | 7/1989 | Daniel | 395/842 |
| 5,163,136 | 11/1992 | Richmond | 395/850 |
| 5,414,813 | 5/1995 | Shiobara | 395/200.75 |
| 5,488,724 | 1/1996 | Firoozmand | 709/212 |
| 5,542,110 | 7/1996 | Minagawa | 395/845 |
| 5,619,497 | 4/1997 | Gallagher et al. | 370/394 |
| 5,673,416 | 9/1997 | Chee et al. | 711/151 |
| 5,717,952 | 2/1998 | Christiansen et al. | 395/842 |
| 5,818,468 | 10/1998 | Le Cornece et al. | 345/521 |
| 5,822,540 | 10/1998 | Caldara et al. | 709/236 |
| 5,903,283 | 5/1999 | Selwan et al. | 345/521 |
| 5,970,069 | 10/1999 | Kumar et al. | 370/402 |

OTHER PUBLICATIONS

"MU95C5480 LANCAM," *Music Semiconductors*, Rev. 0, pp. 1–12. (Jul. 22, 1994).
"Information technology—Telecommunications and information exchange between systems—High–level data control (HDLC) procedures—Elements of procedures," *ISO/IEC 4335*, Fifth edition. (Dec. 15, 1993).
"Information technology—Telecommunications and information exchange between systems—High–level data control (HDLC) procedures—Frame structure," *ISO/IEC 3309*, Fifth edition. (Dec. 15, 1993).
W. Simpson, Editor, Daydreamer, "PPP in HDLC–like Framing," pp. 1–25, (last modified Jul. 1994) <ftp://ds.internic.net/rfc>.

*Primary Examiner*—Thomas C. Lee
*Assistant Examiner*—Tammara Peeyton
*Attorney, Agent, or Firm*—Westman, Champlin & Kelly, P.A.

[57] ABSTRACT

A data communication circuit buffers data between a shared resource and a plurality of data communication interfaces through a plurality of respective first-in-first-out ("FIFO") buffers. The data is divided into multiple-bit data frames having a start and an end. The circuit maintains a priority level for each FIFO buffer and initializes the priority level of each FIFO buffer to a first priority level. The circuit passes bits of the multiple-bit data frames from the shared resource to respective ones of the FIFO buffers in a buffer order which is based on the priority level of each FIFO buffer. The circuit passes the bits from the FIFO buffers to the respective data communication interfaces and selectively increases the priority level of each FIFO buffer to a second, higher priority level as a function of a level the bits within the FIFO buffer and whether the end of at least one data frame is stored in the FIFO buffer.

13 Claims, 4 Drawing Sheets

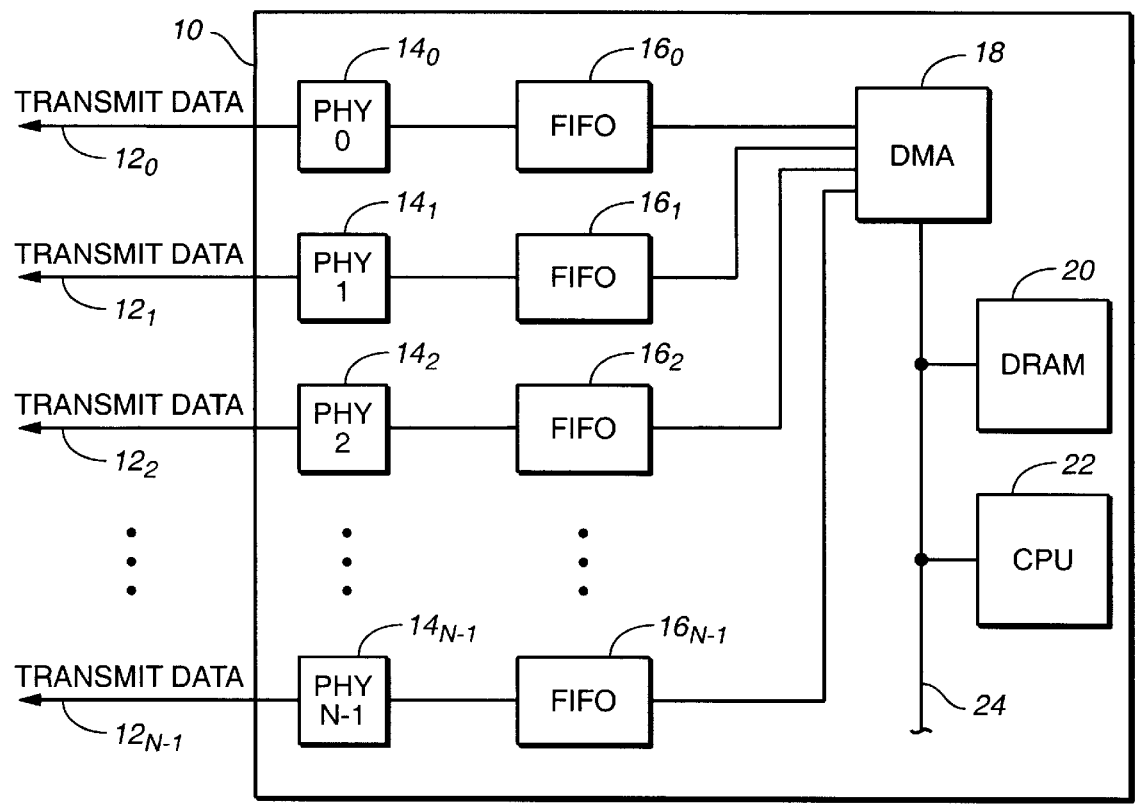
FIG._1
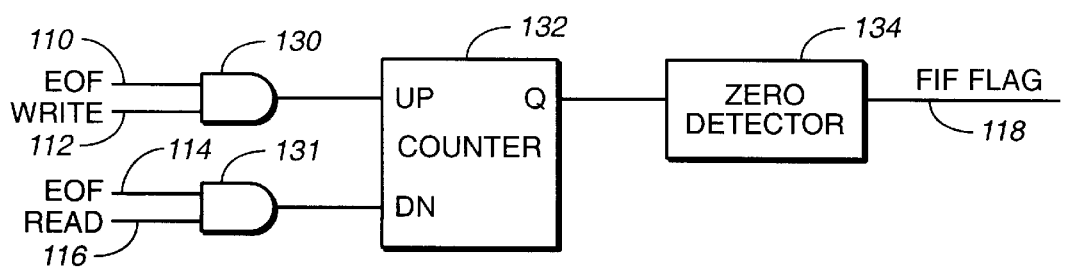
FIG._3

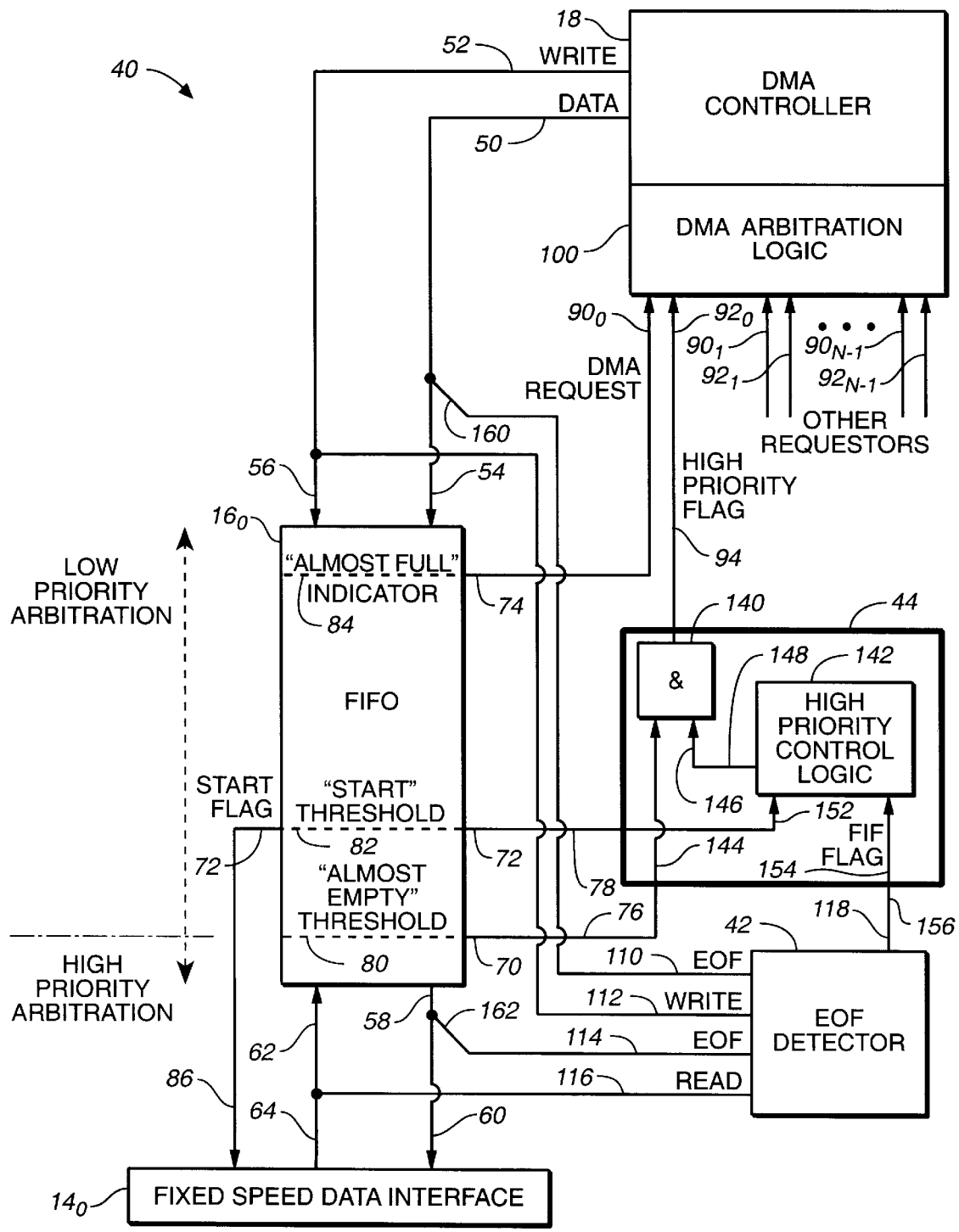
FIG._2

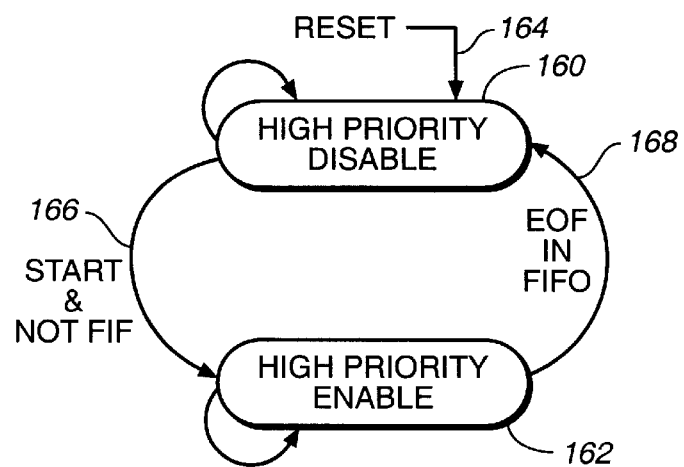
FIG._4
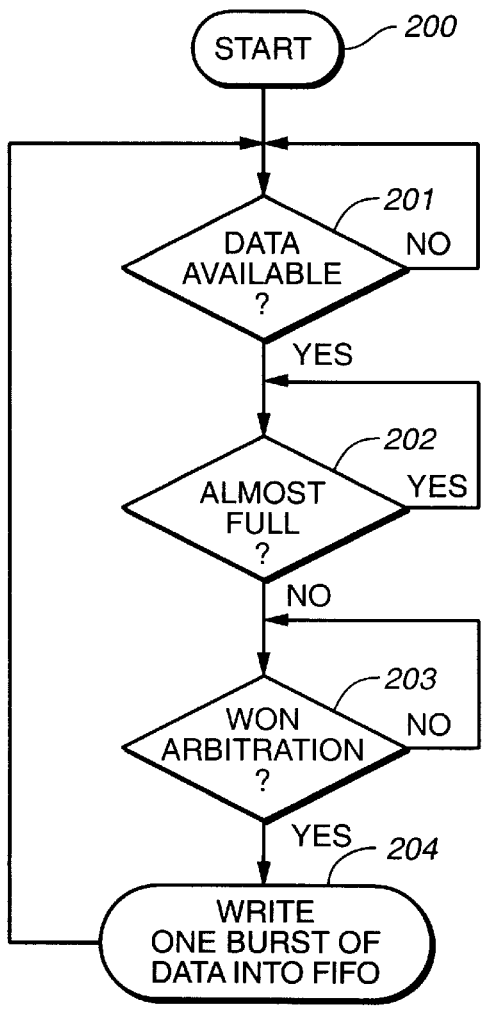
FIG._5A
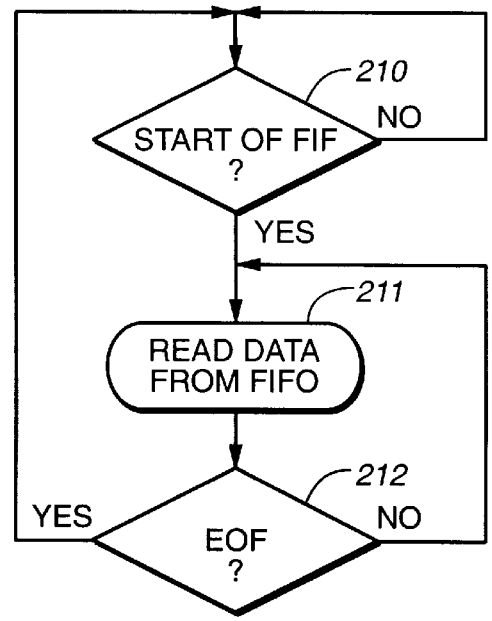
FIG._5B

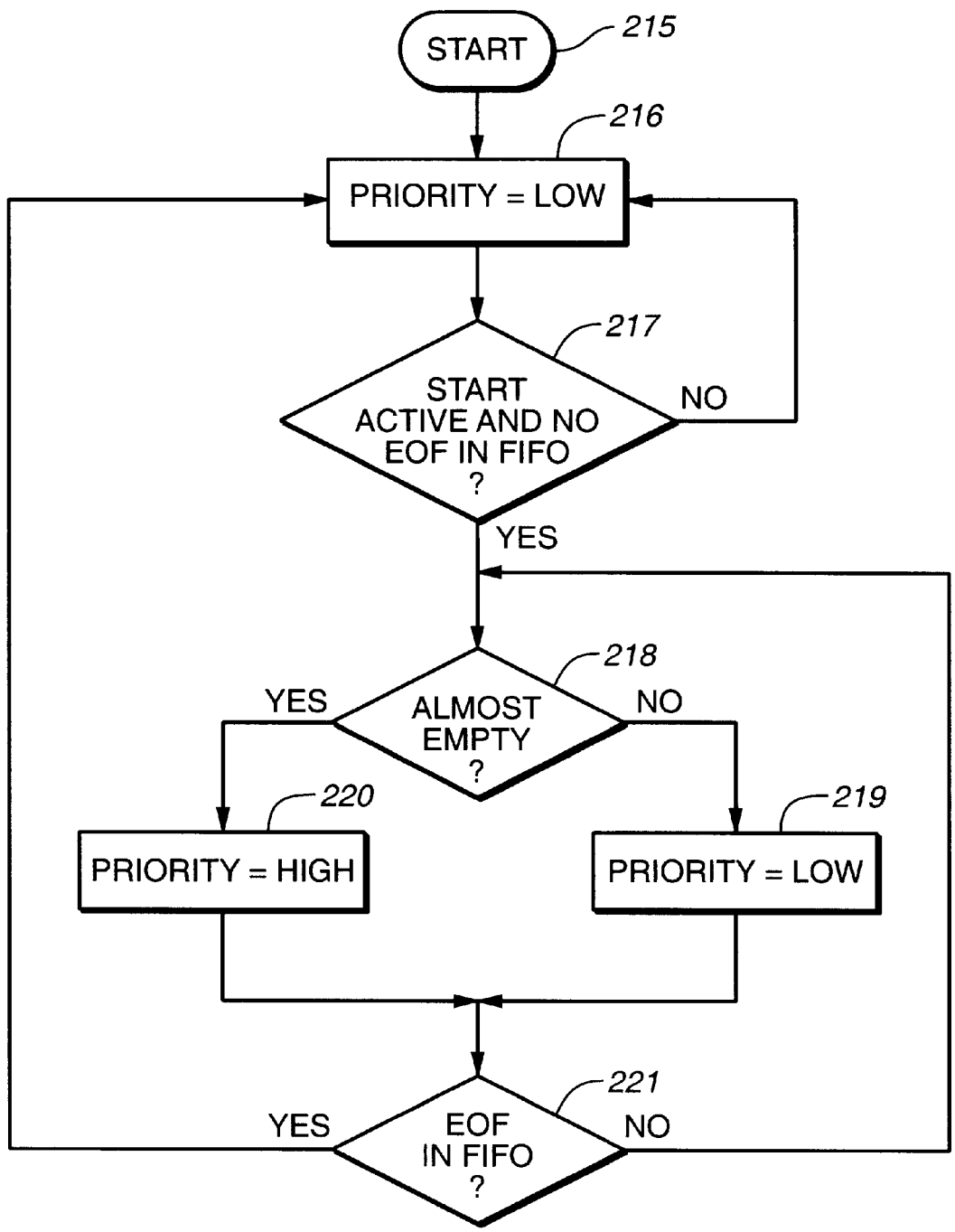
FIG._5C

DATA COMMUNICATION CIRCUIT AND METHOD FOR BUFFERING DATA BETWEEN A SHARED RESOURCE AND MULTIPLE INTERFACES

BACKGROUND OF THE INVENTION

The present invention relates to data communication circuits having multiple interfaces which arbitrate for a single resource. More particularly, the present invention relates to a priority control circuit for controlling the arbitration.

Data communication circuits such as network devices and telecommunication circuits typically have several communication channels for connecting to multiple devices such as workstations, telephone and television systems, video teleconferencing systems and other facilities over common data links or carriers. In these applications, it is common for all communication channels to share a common resource, such as a system memory. Each channel includes a data interface controller, such as a serial wide area network (SWAN) controller or a local area network (LAN) controller. The data interface controller is coupled to the shared resource for controlling transmission of the data over the data link or carrier.

Data interface controllers are often configured to transmit packets of data having an arbitrary length at a fixed speed. For example, a WAN controller may transmit an Internet Protocol (IP) packet over an fixed speed ISDN Basic Rate Interface (BRI) using high level data length control (HDLC) framing. Alternatively, a LAN controller such as an Ethernet controller may transmit an IP packet a fixed speed 10 Mbps LAN. A direct memory access (DMA) controller is often used for arbitrating access to the shared resource among multiple data interface controllers.

A first-in-first-out (FIFO) buffer has been used for buffering transmit and receive data between the DMA controller and each data interface controller. During a transmit operation, the DMA controller feeds the data packets to one end of the FIFO at a DMA transmission rate, and the data interface controller reads the packets at the other end of the FIFO at the rate of the fixed speed data interface. The FIFO is needed because the DMA transmission rate is generally substantially higher on average than the rate of the fixed speed data interface. Also, the DMA controller is subject to "gaps" in its ability to feed the FIFO because of memory access latencies, contention with other master devices that are coupled to the memory bus and control logic overhead.

Each FIFO is accompanied by control logic that requests service from the DMA controller when the amount data in the FIFO drops below a certain point. This amount is chosen such that even with worst-case memory access latency, bus contention and control overhead, the data in the FIFO will not be completely drained by the fixed speed data interface. This results in a relatively large FIFO.

In silicon application specific integrated circuit (ASIC) implementations, the area on the integrated circuit die that is dedicated to FIFO memory is very expensive compared to the memory typically used for an off-chip memory such as a dynamic random access memory (DRAM). It is therefore advantageous to be able to implement the smallest FIFO possible while maintaining the ability to pass data without risking FIFO underruns. This task is made more complex when multiple data interfaces exist and each data interface requires access to the same DMA controller to pull data from an external, off-chip memory.

The traditional approach for keeping in the FIFO size small even with multiple data interfaces competing for the same DMA controller has been to create a multiple priority scheme. In such a scheme, the FIFO associated with each data interface provides a signal to an arbitration logic block that indicates its priority. In a two priority system, FIFOs that contain only a small amount of data are closer to experiencing an underrun condition and therefore signal a "high priority" arbitration request to the arbitration block. FIFOs that contain relatively more data are not as close to experiencing an underrun condition and therefore signal a "normal priority" arbitration request to the arbitration logic. Such a system ensures that FIFOs that need service urgently get serviced sooner than FIFOs that need service less urgently. In effect, FIFOs that contain more data are less likely to get even more data from the DMA controller because other FIFOs with less data are able to assert the high priority arbitration request. This serves to lower the peak FIFO size.

However, such systems require the fixed speed data interface to be configured to start extracting data from the FIFO only after a set amount of data is in the FIFO. This point is referred to as a "start threshold". If the fixed speed data interface is allowed to extract data from the FIFO as soon as the first bit of data is stored in the FIFO from the DMA controller, the FIFO will have very little tolerance for DMA controller delays that may be occasioned by memory access latencies, bus contention and control logic overhead. If the FIFO runs out of data before the entire data packet has been transmitted, a FIFO underrun occurs which corrupts the transmission. The amount of data that needs to be in the FIFO before the fixed speed data interface is allowed to begin extracting data from the FIFO is calculated to accommodate the worst-case DMA controller delays.

The traditional method of implementing the multiple priority scheme suffers from a key deficiency. In a situation where multiple fixed speed data interfaces exist, each with their own logical FIFO channel, it is fairly common to have all of the FIFO's arbitrating at high priority simultaneously. This situation occurs when all of the fixed speed data interfaces begin transmitting a data packet at one time. At the beginning of a transmission, all of the FIFOs will be nearly empty, and will therefore arbitrate at high priority. This means that, in the worst-case, one of the FIFOs will have to wait for the DMA controller to satisfy all of the other FIFOs' requests for data before its own request is satisfied, despite having its "high priority" flag asserted. Because this adds to the worst-case time before the FIFO gets serviced, it increases where the "start threshold" needs to be set. This adds to the FIFO size because the FIFO needs to be at least as the largest of the thresholds computed for the FIFO. A second deficiency of the higher "start threshold" is that system latency increases because the fixed speed data interface is not permitted to start its transmission until more data has accumulated in the FIFO.

The data communication and priority control circuit of the present invention addresses these and other problems and offers other advantages over the prior art.

SUMMARY OF THE INVENTION

One aspect of the present invention relates to a method of buffering data between a shared resource and a plurality of data communication interfaces through a plurality of respective first-in-first-out ("FIFO") buffers, wherein the data is divided into multiple-bit data frames having a start and an end. The method includes: maintaining a priority level for each FIFO buffer; initializing the priority level of each FIFO buffer to a first priority level; passing bits of the multiple-bit data frames from the shared resource to respective ones of the FIFO buffers in a buffer order based on the priority level of each FIFO buffer; passing the bits of the multiple-bit data frames from the FIFO buffers to the respective data communication interfaces; and selectively increasing the priority level of each FIFO buffer to a second, higher priority level as a function of a level the bits within the FIFO buffer and whether the end of at least one data frame is stored in the FIFO buffer.

Another aspect of the present invention relates to a priority control circuit for selecting the priority level for each FIFO buffer. The priority control circuit includes a storage level input, a frame-in-FIFO input, a priority output and a priority logic circuit. The storage level input receives a storage level signal which indicates a storage level of the FIFO buffer relative to a threshold level. The frame-in-FIFO input receives a frame-in-FIFO signal which indicates whether the end of at least one of the data frames is stored in the FIFO buffer. The priority logic circuit is coupled to the storage level input and the frame-in-FIFO input and is adapted to generate a priority signal on the priority output based on the storage level signal and the frame-in-FIFO signal.

Another aspect of the present invention relates to a method of buffering data which, for each FIFO buffer, includes: maintaining a priority level for the FIFO buffer; initializing the priority level to a first priority level; passing bits of one of the data frames from the shared resource to the FIFO buffer based on the priority level of the FIFO buffer; setting an almost empty flag for the FIFO buffer to an active state when the level of stored bits is less than a first threshold and an inactive state when the level of stored bits is greater than the first threshold; setting a start flag for the FIFO buffer to an active state when the level of stored bits exceeds a second, higher threshold and an inactive state when the level of stored bits is less than the second threshold; starting retrieval of the data frame from the FIFO buffer by the respective data interface after the start flag is set to the active state; enabling a second, higher priority level after the start flag is set to the active state; and increasing the priority level to the second priority level during retrieval of the data frame if the almost empty flag is active and the second priority level is enabled.

BRIEF DESCRIPTION OF THE DRAWINGS

FIG. 1 is a block diagram of a data communication circuit having multiple communication channels according to one embodiment of the present invention.

FIG. 2 is a logic diagram illustrating one of the communication channels in greater detail.

FIG. 3 is a diagram showing an end-of-frame ("EOF") detector in the communication channel shown in FIG. 2 in greater detail.

FIG. 4 is a state diagram illustrating the function of a high priority enable circuit in the communication channel shown in FIG. 2.

FIGS. 5A–5C are flow charts illustrating a method of buffering transmit data in accordance with one embodiment of the present invention.

DETAILED DESCRIPTION OF THE PREFERRED EMBODIMENTS

FIG. 1 is a block diagram of a data communication circuit having multiple communication channels according to one embodiment of the present invention. Each communication channel arbitrates for a single, shared resource. Data communication circuit 10 includes transmit ports $12_0$–$12_{N-1}$, fixed speed data interface controllers $14_0$–$14_{N-1}$, transmit first-in-first-out (FIFO) buffers $16_0$–$16_{N-1}$, direct memory access (DMA) controller 18, shared system memory 20 and central processing unit (CPU) 22.

Transmit ports $12_0$–$12_{N-1}$ are coupled to the outputs of data interface controllers $14_0$–$14_{N-1}$, respectively. Data interface controllers $14_0$–$14_{N-1}$ are labeled "PHY 0"–"PHY N-1" and can include Physical Layer devices, for example, which interface with common data links or carriers through transmit ports $12_0$–$12_{N-1}$, respectively. For example, data interface controllers $14_0$–$14_{N-1}$ can include a serial wide area network (SWAN) controller or a local area network (LAN) controller. These controllers can be configured to implement a desired protocol such as Ethernet, Frame Relay (T1/E1 or fractional T1/E1), ISDN basic rate interface (BRI), asynchronous transfer mode (ATM), ADSL, High Level Data and Link Control (HDLC). Other types of data interface controllers or circuits can also be used.

Data interface controllers $14_0$–$14_{N-1}$ are coupled to DMA controller 18 through respective transmit FIFOs $16_0$–$16_{N-1}$. Each transmit FIFO $16_0$–$16_{N-1}$ includes a plurality of random access memory (RAM) locations for buffering transmit data from DMA controller 18 to data interface controllers $14_0$–$14_{N-1}$. Transmit FIFOs $16_0$–$16_{N-1}$ can be formed by separate memory devices or by separate address ranges or blocks within the same memory device.

DMA controller 18 is coupled to memory 20 and CPU 22 over memory bus 24. In one embodiment, memory 20 includes a dynamic random access memory (DRAM). DMA controller 18 operates as a data routing circuit which routes transmit data in multiple-bit data frames from memory 20 to one of the transmit FIFOs $16_0$–$16_{N-1}$ where it can be accessed by its respective data interface controller $14_0$–$14_{N-1}$. Each data interface controller and its respective transmit FIFO define a logical communication channel within data communication circuit 10.

During operation, if there is data to be transmitted and FIFOs $16_0$–$16_{N-1}$ are not full, each FIFO requests service by DMA controller 18. DMA controller 18 services one FIFO at a time according to a selected arbitration scheme. When a particular transmit FIFO is being serviced, DMA controller 44 retrieves a word or byte of the requested data frame from memory 20 and passes the word or byte to the input of the respective FIFO. DMA controller 18 continues to pass each successive word or byte of the data frame from memory 20 to the respective transmit FIFO until the entire data frame has been transmitted, the FIFO is full or another transmit FIFO having a higher priority according to the selected arbitration scheme requests service.

When a sufficient amount of data is in a particular FIFO $16_0$–$16_{N-1}$, the corresponding data interface controller $14_0$–$14_{N-1}$ begins retrieving the stored words or bytes at a constant rate, beginning with the first word or byte that was passes by DMA controller 18 until the entire data frame has been extracted from the FIFO. Data interface controllers $14_0$–$14_{N-1}$ add any necessary header information such as address and control information to the data, frame the header and data according to the selected protocol and then transmit the framed header and data through transmit ports $12_0$–$12_{N-1}$. Data interface controllers $14_0$–$14_{N-1}$ can operate at configurable and widely varying speeds.

Each communication channel in data communication circuit 10 shares DMA controller 18 and memory 20. Transmit FIFOS $16_0$–$16_{N-1}$ are needed because the rate DMA controller 18 feeds each transmit FIFO is substantially higher on average than the fixed rate at which data interface controllers $14_0$–$14_{N-1}$ retrieve data from each transmit FIFO. Also, DMA controller 18 is subject to "gaps" in its ability to feed individual transmit FIFOs because of access latencies of memory 20, contention on memory bus 24 with other bus masters such as CPU 22, service of other transmit FIFOs and control logic overhead.

As described in more detail below with reference to FIGS. 2–5, data communication circuit 10 reduces the size required for each FIFO and reduces the transmission latency through each FIFO by controlling the priority of each FIFO based on the amount of data stored in the FIFO and whether an the end of a data frame is contained in the FIFO. At the beginning of operation each FIFO $16_0$–$16_{N-1}$ is initialized to a first, "low" priority level. Each FIFO $16_0$–$16_{N-1}$ will be empty and will request service by DMA controller 18. DMA controller 18 services each transmit FIFO according to a selected arbitration scheme, such as a "round robin" arbitration scheme or a fixed arbitration scheme. Other arbitration schemes can also be used. The priority level for a particular FIFO is increased to a second, higher priority level only if the corresponding data interface controller has started to transmit a data frame, the FIFO is almost empty and the end of the data frame has not yet been passed to the FIFO by DMA controller 18. Once the end of the data frame is within the FIFO or the FIFO is not almost empty, the FIFO returns to the lower priority level. This prevents the FIFOs $16_0$–$16_{N-1}$ from arbitrating at the high priority unless a condition exists whereby an underrun would cause transmission problems.

FIG. 2 is a logical diagram illustrating one of the communication channels in greater detail. Communication channel 40 includes fixed speed data interface controller $14_0$, transmit FIFO $16_0$, DMA controller 18, end-of-frame ("EOF") detector 42 and priority control circuit 44. DMA controller 18 has a data output 50 and a write control output 52. When DMA controller 18 passes a word or byte to transmit FIFO $16_0$, DMA controller 18 provides the word or byte on data output 50 and applies a write pulse, such as a logic high or low pulse, to write control output 52. Transmit FIFO $16_0$ receives the write pulse on write control input 56 and stores the word or byte received on data input 54 at a selected address. The control circuitry within transmit FIFO $16_0$ maintains a write pointer (riot shown) which points to a current address within the FIFO at which the word or byte will be stored. Transmit FIFO $16_0$ increments the address of the write pointer after each word or byte is written into the FIFO.

Transmit FIFO $16_0$ has a data output 58 which is coupled to data input 60 of fixed speed data interface controller $14_0$. Transmit FIFO $16_0$ also includes a read control input 62 which is coupled to read control output 64 of data interface controller $14_0$. Data interface controller $14_0$ reads each subsequent word or byte that is stored in transmit FIFO $16_0$ at fixed rate by providing a series of read pulses on read control output 64. The control circuitry within transmit FIFO $16_0$ maintains a read pointer (also not shown) which is incremented with each read pulse received on read control input 62. As each read pulse is received on read control input 62, transmit FIFO $16_0$ provides the word or byte of the data frame that is stored in the address referenced by the current read pointer to data output 58.

The control circuitry within transmit FIFO $16_0$ also maintains several status flags which reflect the amount of data stored within the FIFO. These status flags include an "almost empty" flag, which is provided on output 70, a "start" flag, which is provided on output 72, and an "almost full" flag which is provided on output 74. The almost empty flag on output 70 has an active state (e.g. a logic high level) when the number of words or bytes stored in transmit FIFO $16_0$ exceeds a first threshold represented by arrow 80 and has an inactive state (e.g. a logic low level) when the number of words or bytes stored in transmit FIFO $16_0$ is less than threshold 80. Output 70 is coupled to input 76 of priority control circuit 44. As data interface controller $14_0$ extracts words or bytes from transmit FIFO $16_0$, the state of the almost empty flag on output 70 indicates whether transmit FIFO $16_0$ is almost out of data.

The start flag on output 72 has an active state when the number of words or bytes stored in transmit FIFO $16_0$ exceeds a second, higher threshold 82. Output 72 is coupled to input 78 of priority control circuit 44 and to input 86 of data interface controller $14_0$. To avoid data underruns, data interface controller $14_0$ is configured to start extracting data from transmit FIFO $16_0$ only after the number of words or bytes stored in transmit FIFO $16_0$ exceeds threshold 82. The amount of data that needs to be in transmit FIFO $16_0$ before data interface $14_0$ is allowed to begin extracting data is calculated to accommodate the worst case delays associated with memory access latencies, contention on memory bus 24 and control logic overhead. If data interface controller $14_0$ were allowed to extract data from transmit FIFO $16_0$ as soon as the first word byte is stored in the FIFO by DMA controller 18, the FIFO would have very little tolerance delays in the ability of DMA controller 18 to supply data to transmit FIFO $16_0$.

The almost full flag on output 74 indicates whether transmit FIFO $16_0$ is almost full of data. Output 74 has an active state if the number of words or bytes stored in transmit FIFO $16_0$ exceeds a third threshold 84 and has inactive state if the number of stored words or bytes is less than threshold 84. the almost full flag on output 74 is coupled to input 90 of DMA controller 18 and serves as a DMA request signal.

As long as transmit FIFO $16_0$ is not almost full, transmit FIFO $16_0$ continually requests service by DMA controller 18 through output 74. If transmit FIFO $16_0$ is almost full, output 74 goes active indicating that no further data transfers should be made to transmit FIFO $16_0$. The status flags on outputs 70, 72 and 74 can be stored in hardware or software registers, for example.

EOF detector 42 and priority control circuit 44 monitor the data being transmitted to and from transmit FIFO $16_0$ and the states of the status flags for generating a high priority flag on priority output 94. The high priority flag has a logic state which is based on the amount of data stored in transmit FIFO $16_0$ and whether the end of at least one data frame is stored within the FIFO. An active state on priority output 94 indicates a high priority arbitration level, and an inactive state on priority output 94 indicates a low priority arbitration level. Priority output 94 is coupled to priority input $92_0$ of DMA controller 18.

Each of the other transmit FIFOs $16_1$–$16_{N-1}$ has a similar EOF detector 42 (not shown) and a similar priority control circuit 44 (also not shown) which are coupled to inputs $90_1$–$90_{N-1}$ and $92_1$–$92_{N-1}$, respectively. The EOF detectors and priority control circuits of the various FIFOs can be implemented as separate circuits for each FIFO or can be grouped together as a single circuit. These circuits can be implemented within the control logic of each transmit FIFO, within DMA arbitration logic 100 or as an independent circuit.

The order in which DMA controller 18 services the DMA requests received on inputs $90_0$–$90_{N-1}$ is determined by DMA arbitration logic 100. In one embodiment, arbitration logic 100 services transmit FIFOs $16_0$–$16_{N-1}$ on order of priority and, among the transmit FIFOs having the same priority, services the FIFOs on a rotating "round robin" basis.

EOF detector 42 detects whether the end of at least one data frame is stored in transmit FIFO $16_0$ by monitoring the data being written to and read from the FIFO. In the embodiment shown in FIG. 2, the data bits provided by DMA controller 18 on data output 50 includes an EOF flag 160. DMA controller 18 sets EOF flag 160 to an active state when the word or byte being written to transmit FIFO $16_0$ is the end of a data frame. EOF flag 160 is coupled to input 110 of EOF detector 42. Write control output 52 of DMA controller 18 is coupled to input 112 of EOF detector 42.

Similarly, one of the bits provided by transmit FIFO $16_0$ on data output 58 includes EOF flag 162. EOF flag 162 corresponds to the EOF flag bit associated with the word or byte presently being read from transmit FIFO $16_0$. When that word or byte is the end of the data frame being transmitted to data interface controller $14_0$, EOF flag 162 is active. EOF flag 162 is coupled to input 114 of EOF detector 42. Read control output 64 of data interface controller $14_0$ is coupled to input 116 of EOF detector 42.

EOF detector 42 monitors the signals generated on inputs 110, 112, 114 and 116 to determine whether the end of at least one data frame is stored within transmit FIFO $16_0$. EOF detector circuit 42 generates an active state on frame-in-FIFO output 118 when the end of at least one data frame is stored in transmit FIFO $16_0$ and generates an inactive state on frame-in-FIFO output 118 when there is no end of a data frame stored in transmit FIFO $16_0$.

FIG. 3 is a diagram showing EOF detector 42 in greater detail. EOF detector 42 includes AND gates 130 and 131, counter 132 and zero detector 134. The EOF flag and the write control signal received on inputs 110 and 112 are provided to the inputs of AND gate 130. The output of AND gate 130 is coupled to the up count control input "UP" of counter 132. The EOF flag and the write control signal received on inputs 114 and 116 are provided to the inputs of AND gate 131. The output of AND gate 131 is coupled to the down count control input "DN" of counter 132. Output count "Q" of counter 132 is applied to the input of zero detector 134. The output of zero detector 134 forms frame-in-FIFO output 118.

If the end of frame is being written to transmit FIFO $16_0$, the EOF flag on input 110 and the write control signal on input 112 will be active, which causes counter 132 to increment the count on output Q by one. If the end of frame is being read from transmit FIFO $16_0$, the EOF flag on input 114 and the read control signal on input 116 will be active, which causes counter 132 to decrement the count on output Q. As long as the end of at least one data frame is stored in transmit FIFO $16_0$, the count on output Q will be greater than 0. If the count on output Q is zero, zero detector 134 generates an inactive state on frame-in-FIFO output 118. If output Q is not zero, zero detector 134 generates an active state on frame-in-FIFO output 118. The logic state on output 118 serves as a frame-in-FIFO ("FIF") flag.

Referring back to FIG. 2, priority control circuit 44 includes AND gate 140 and high priority enable logic 142. AND gate 140 has an input 144 which is coupled to input 76 for receiving the almost empty flag, an input 146 which is coupled to high priority enable output 148 of high priority enable logic 142 and an output which forms priority output 94. High priority enable logic 122 has an input 152 which is coupled to input 78 for receiving the start flag and an input 154 which is coupled to frame-in-FIFO input 156 for receiving the FIF flag from EOF detector 42.

FIG. 4 is a state diagram illustrating the function of high priority enable logic 122. In the embodiment shown in FIG. 4, high priority enable logic 122 includes a state machine having two states, a high priority disable state 160 and a high priority enable state 162. At start-up or after a system reset, as indicated by arrow 164, logic 122 is initialized to high priority disable state 160 in which enable output 148 is inactive. The inactive state of enable output 148 resets priority output 94 of AND gate 120 to the inactive state, indicating that transmit FIFO $16_0$ arbitrates at the normal, low priority level. Therefore, at start-up or whenever all data interface controllers $14_0$–$14_{N-1}$ start to transmit data frames at one time, the corresponding transmit FIFOs $16_0$–$16_{N-1}$ all arbitrate at the normal, low priority level.

Enable logic 142 enters high priority enable state 162 through arrow 166 once two conditions are satisfied: 1) the start flag on input 78 has become active, indicating that there is enough data in transmit FIFO $16_0$ to begin transmitting to data interface $14_0$; and 2) the frame-in-FIFO input 156 is inactive, indicating that there is no end of frame stored within transmit FIFO $16_0$. In enable state 162, high priority enable output 148 is active, thereby enabling AND gate 140.

If the almost empty flag on input 76 is inactive, indicating that the amount of data in transmit FIFO $16_0$ exceeds threshold 80, priority output 94 will remain inactive and transmit FIFO $16_0$ will continue to arbitrate at the normal, low priority level. If the almost empty flag on input 76 is active, indicating that transmit FIFO $16_0$ is almost out of data, priority output 94 will become active and transmit FIFO $16_0$ will arbitrate at the high priority level. Transmit FIFO $16_0$ will therefore get serviced by DMA controller 18 before all other transmit FIFOs that are arbitrating at the normal, low priority level. If more than one transmit FIFO is arbitrating at the high priority level, a traditional arbitration scheme can be used by DMA arbitration logic 100 as discussed above to determine which transmit FIFO gets serviced first.

If the end of the present data frame being transmitted by data interface $14_0$ is written into transmit FIFO $16_0$, frame-in-FIFO input 156 will become active. The active state on input 156 causes enable logic 142 to move to high priority disable state 160 through arrow 168 in FIG. 4, and high priority enable output 148 becomes inactive. The inactive state on high priority enable output 148 causes priority output 94 to go inactive, which results in transmit FIFO $16_0$ arbitrating at the normal, low priority level. Since the end of the data frame is stored in transmit FIFO $16_0$, even if the amount of data stored in transmit FIFO $16_0$ is less than threshold 80, an underrun for that data frame cannot occur. This prevents transmit FIFO $16_0$ from arbitrating at the high priority level unless a condition exists whereby an underrun would cause transmission problems such as when data interface $14_0$ has started to transmit the data frame, and the end of the frame has not yet been sent by DMA controller 18 to transmit FIFO $16_0$.

FIGS. 5A–5C are flow charts illustrating a method of buffering data between a shared resource and a plurality of data communication interfaces according to one embodiment of the present invention. FIG. 5A shows the process of passing data from the DMA controller (the shared resource) to one of the transmit FIFOS. This process is executed for each of the other transmit FIFOs. The process starts at step 200 with a start-up condition or a system reset. At step 201, the DMA controller determines whether there is data available for transmission to the transmit FIFO. If there is no data available, the DMA controller waits at step 201. If there is data available, the DMA controller checks the almost full flag from the transmit FIFO, at step 202. If the almost full flag is active, the transmit FIFO is almost full and the DMA controller waits at step 202. Once the almost full flag becomes inactive, the DMA controller determines whether that transmit FIFO has won arbitration over the other transmit FIFOs, at step 203. If not, the DMA controller waits until it is that transmit FIFO's turn to be serviced. When the transmit FIFO has won arbitration, the DMA controller writes one burst of data into the transmit FIFO, at step 204, and the DMA controller returns to step 201 to check for additional data.

FIG. 5B shows the process of passing data from one of the transmit FIFOs to the corresponding data interface controller. At step 210, the data interface controller checks the start flag and the frame-in-FIFO (FIF) flag provided by the transmit FIFO. If neither of these flags are active, the data interface controller waits at step 210. If the start flag becomes active, then there is enough data in the transmit FIFO for the data interface controller to begin retrieving the data at a constant rate until the entire data frame has been retrieved, at step 210. If the FIF flag is active, but the start flag is not active, then there is a small data frame in the FIFO which is not large enough to activate the start flag. This data frame can be retrieved, at step 211, without causing an underrun for that frame since the end of the frame is in the FIFO. The data interface controller continues to read data from the transmit FIFO at step 212 until the end of the frame is read, at step 212. Once the end of the frame is read by the data interface controller, the process returns to step 210 to wait for another data frame.

FIG. 5C shows the process of determining the priority for one of the transmit FIFOs. This process is also executed for each of the other transmit FIFOs. The process starts at step 215 with a start-up condition or a system reset. At start-up, the almost empty flag will be active, the start flag will be inactive and the almost full flag will be inactive. At step 216, the priority control logic sets the priority of the transmit FIFO to the low priority level. At step 217, if the start flag is inactive or if the end of at least one data frame is in the FIFO, the priority control logic maintains the priority of the FIFO at the low level. If the start flag is active and if there is no end of frame in the FIFO, the priority control logic checks the almost empty flag of the FIFO, at step 218. If the FIFO is not almost empty, the priority control logic maintains the priority level of the FIFO at the low level, at step 219. If the FIFO is almost empty, the priority control logic sets the priority level of the FIFO to the high level, at step 220. At step 221, the priority control logic check to see whether the end of the data frame has been written into the FIFO. If not, the priority control logic continues to watch the almost empty flag at step 218. If the almost empty flag becomes inactive, the priority control logic returns the returns the priority level of the FIFO to the low level, at step 219. At step 221, once the end of the data frame being transmitted is written into the FIFO, the priority control logic returns the the FIFO to the low priority level, at step 216, and the process repeats.

The data communication circuit and method of the present invention reduce the size of the transmit FIFO that is needed for buffering data between a shared resource and multiple data interfaces by reducing the maximum time that the transmit FIFO needs to wait for DMA service when it is most needed. The magnitude of the reduction in FIFO size depends strongly on system parameters such as worst case memory latency, arbitration overhead and the number of data interfaces. The circuit and method reduce the chance that the transmit FIFO will arbitrate at the high priority level. Therefore, a transmit FIFO at high priority is less likely to have competition from another transmit FIFO that is also at the high priority level. The transmit FIFO at the high priority level will therefore see a quicker response to its DMA request when it is most needed. This reduces the required FIFO size. As a result, more data interfaces can be implemented on a single integrated circuit such as an application specific integrated circuit (ASIC). In one embodiment, all the elements of FIGS. 1–3 are implemented on a single ASIC.

The present invention provides automatic compensation for data communication interface speed variations. Once the fastest possible data interface speed is accommodated, all slower speeds and any combination of fast and slow speeds will work equally well. In a traditional two priority arbitration scheme, all the transmit FIFOs regularly arbitrate at high priority at the beginning of a data frame, regardless of the data rate of the associated data interface. This created a strong pressure to make the "start" flag and the "almost empty" flag thresholds data rate-dependent. Lowering these thresholds in the case of a slow data interface would safely shorten the period of time that the slow data interface arbitrates at a high priority, thus reducing the peak FIFO size requirements. However, this extra control complexity is not needed in the present invention because the transmit FIFOs do not arbitrate at high priority at the beginning of a data frame since the start flag has not yet been set.

The present invention lowers peak transmission latency. The fact that all of the data interfaces in a traditional two-priority scheme arbitrated at high priority at the beginning of a data frame did not lower the peak latency that a frame could encounter at transmission because all the other interfaces could arbitrate at the high priority level simultaneously. Since the start flag threshold in the present invention does not have to be higher to account for worst case peak arbitration overhead, the present invention lowers peak latency parameters.

Although the present invention has been described with reference to preferred embodiments, workers skilled in the art will recognize that changes may be made in form and detail without departing from the spirit and scope of the invention. For example, many elements of the data communication circuit can be implemented in either hardware or software. Individual signals can be active high or active low, and the terms "active" and "inactive" are interchangeable. The corresponding circuitry can be inverted to suit a particular convention. The term "coupled" can include various types of connections or couplings and can include a direct connection or a connection through one or more intermediate components.

What is claimed is:

1. A method of buffering data between a shared resource and a plurality of data communication interfaces through a plurality of respective first-in-first-out ("FIFO") buffers, wherein the data is divided into multiple-bit data frames having a start and an end, the method comprising:
   maintaining a priority level for each FIFO buffer;
   initializing the priority level of each FIFO buffer to a first priority level;
   passing bits of the multiple-bit data frames from the shared resource to respective ones of the FIFO buffers in a buffer order based on the priority level of each FIFO buffer;

passing the bits of the multiple-bit data frames from the FIFO buffers to the respective data communication interfaces; and selectively increasing the priority level of each FIFO buffer to a second, higher priority level as a function of a level the bits within the FIFO buffer and whether the end of at least one data frame is stored in the FIFO buffer.

2. The method of claim 1 and further comprising:

maintaining an almost empty flag for each FIFO buffer which, when active, indicates that the level of the bits within the FIFO buffer is less than a first threshold;

maintaining a frame-in-FIFO flag for each FIFO buffer which, when active, indicates that the end of at least one of the multiple-bit data frames is stored within th e FIFO buffer; and wherein the step of selectively increasing the priority level comprises increasing the priority level of a particular FIFO buffer to the second priority level if the almost empty flag of that FIFO buffer is active and the frame-in-FIFO flag for that FIFO buffer is inactive.

3. The method of claim 2 and further comprising:

resetting the priority level of the particular FIFO buffer from the second priority level to the first priority level if the almost empty flag of that FIFO buffer is inactive or if the frame-in-FIFO flag for that FIFO buffer is active.

4. The method of claim 2 and further comprising:

setting a start flag to an active state for each FIFO buffer when the level of the bits stored within in the FIFO buffer exceeds a second threshold, which is gr eater than the first threshold;

wherein passing the bits of the multiple-bit data frames from the FIFO buffers to the respective data interfaces comprises retrieving the entire data frame from the FIFO buffer after the start flag has been set the active sate; and wherein the step of selectively increasing the priority level comprises increasing the priority level of a particular FIFO buffer to the second priority level during the step of retrieving the data frame if the almost empty flag of that FIFO buffer is active, the frame-in-FIFO flag of that FIFO buffer is inactive and the start flag has been set to the active state.

5. The method of claim 1 and further comprising:

setting an almost full flag to an active state for each FIFO buffer when the FIFO buffer is almost full; and wherein the step of passing the bits of the multiple-bit data frames from the shared resource to respective ones of the FIFO buffers comprises passing the bits only if the almost full flag of that FIFO buffer is inactive.

6. A data communication circuit for buffering data which is divided into multiple-bit data frames having a start and an end, the circuit comprising:

a data routing circuit;

a plurality of first-in-first-out ("FIFO") buffers, each buffer comprising a data input coupled to the data routing circuit for receiving bits of respective data frames from the data routing circuit, a plurality of storage locations for storing the received bits, a data output, and a storage level output which indicates a level of the stored bits within the FIFO buffer;

a plurality of data interfaces, each data interface being coupled to the data output of a respective FIFO buffer;

an end-of-frame detector circuit coupled to the data input of each FIFO buffer and generating a frame-in-FIFO output for each FIFO buffer which indicates whether the end of at least one of the data frames is stored in that FIFO buffer; and a priority circuit coupled to the data routing circuit and generating a priority level output for each FIFO buffer which is based on the frame-in-FIFO output and the storage level output of that FIFO buffer.

7. The data communication circuit of claim 6 wherein:

the FIFO buffer further comprises a write control input which is coupled to the data routing circuit and a read control input which is coupled to the data interface, and end-of-frame input which is coupled to the data routing circuit and an end-of-frame output which is coupled to the data interface; and the end-of-frame detector comprises, for each FIFO buffer: an OR gate having inputs coupled to the end-of-frame input and the end-of-frame output; a counter having a count enable input coupled to the output of the OR gate, an up control input coupled to the write control input, a down control input coupled to the read control input and an output; and a zero detector circuit having an input coupled to the output of the counter and an output which forms the frame-in-FIFO output.

8. The data communication circuit of claim 6 wherein:

the storage level output comprises an almost empty flag output which indicates whether the level of the stored bits in the FIFO buffer exceeds a first threshold;

each FIFO buffer further comprises a start flag output which indicates whether the level of the stored bits in the FIFO buffer exceeds a second threshold which is greater than the first threshold; and the priority circuit comprises:

a state machine comprising a first input coupled to the frame-in-FIFO output, a second input coupled to the start flag output and a high priority enable output which has an active state if the frame-in-FIFO output is inactive and the start flag output is active and has an inactive state if the frame-in-FIFO output is active; and an AND gate having a first input coupled to the almost empty output flag, a second input coupled to the high priority enable output, and an output which forms the priority level output.

9. The data communication circuit of claim 6 wherein:

the data routing circuit comprises a data request input for each FIFO buffer; and each FIFO buffer further comprises an almost full flag for each FIFO buffer which is coupled to a corresponding one of the data request inputs and, when active, indicates that the FIFO buffer is almost full.

10. A priority control circuit for selecting a priority level for a data communication first-in-first-out ("FIFO") buffer which is a dap ted to buffer multiple-bit data frames having a start and an end, the circuit comprising:

a first storage level input for receiving a first storage level signal which indicates a storage level of the FIFO buffer relative to a first threshold level;

an frame-in-FIFO input for receiving a frame-in-FIFO signal which indicates whether the end of at least one of the data frames is stored in the FIFO buffer;

a priority output; and a priority logic circuit which is coupled to the first storage level input and the frame-in-FIFO input and is adapted to generate a priority signal on the priority output based on the first storage level signal and the frame-in-FIFO signal.

11. The priority control circuit of claim 10 wherein: the first storage level signal is in an
   active state if the storage level of the FIFO buffer is less than the first threshold level and is otherwise in an inactive state;
   the frame-in-FIFO signal is in an active state if the end of at least one of the data frames is stored in the FIFO buffer and is otherwise in an inactive state;
   the priority logic circuit is adapted to set the priority signal to indicate a first priority level if the first storage level signal is in the inactive state or if the frame-in-FIFO status signal is in the active state; and
   the priority logic circuit is adapted to set the priority signal to indicate a second priority level if the first storage level signal is in the active and the frame-in-FIFO signal is in the inactive state.

12. The priority control circuit of claim 11 and further comprising:
   a second storage level status input for receiving a second storage level signal which has an active state if the storage level of the FIFO buffer exceeds a second threshold level, which is greater than the first threshold level; and
   the priority logic circuit comprises:
      a state machine having a first input coupled to the second storage level input, a second input coupled to the frame-in-FIFO input, and a high priority enable output, wherein the high priority enable output is in an active, enable state if the second storage level signal is in the active state and the frame-in-FIFO signal is in the inactive state and wherein the high priority enable output is in an inactive, disable state if the frame-in-FIFO signal is in the active state; and
      a logic AND circuit having a first input coupled to the first storage level input, a second input coupled to the high priority enable output and an output coupled to the priority output.

13. A method of buffering data between a shared resource and a plurality of data interfaces through a plurality of respective first-in-first-out ("FIFO") buffers, wherein the data is divided into multiple-bit data frames having a start and an end, the method comprising, for each FIFO buffer:
   maintaining a priority level for the FIFO buffer;
   initializing the priority level to a first priority level;
   passing bits of one of the data frames from the shared resource to the FIFO buffer based on the priority level of the FIFO buffer;
   setting an almost empty flag for the FIFO buffer to an active state when the level of stored bits is less than a first threshold and an inactive state when the level of stored bits is greater than the first threshold;
   setting a start flag for the FIFO buffer to an active state when the level of stored bits exceeds a second, higher threshold and an inactive state when the level of stored bits is less than the second threshold;
   starting retrieval of the data frame from the FIFO buffer by the respective data interface after the start flag is set to the active state;
   enabling a second, higher priority level after the start flag is set to the active state; and
   increasing the priority level to the second priority level during retrieval of the data frame if the almost empty flag is active and the second priority level is enabled.

* * * * *